March 8, 1927.
L. W. CHASE
1,620,441
RIDGE SPLITTER ATTACHMENT
Filed Nov. 18, 1925
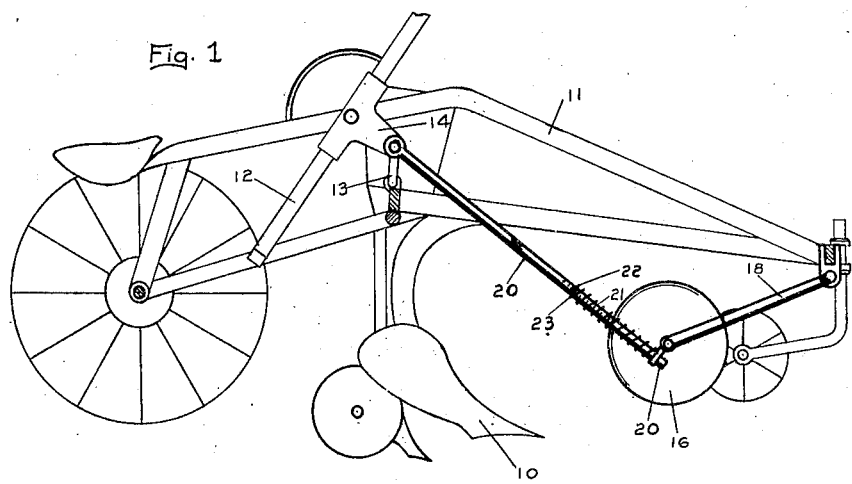
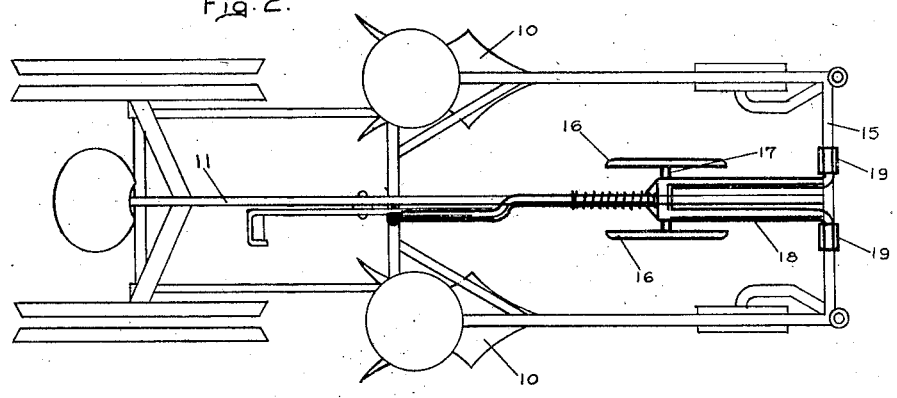
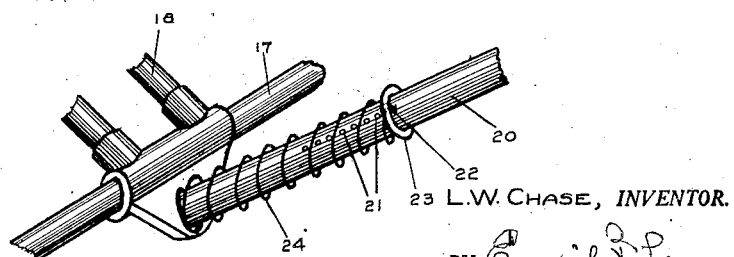
L.W. CHASE, INVENTOR.
BY Emil F Lange
ATTORNEY Patented Mar. 8, 1927.

1,620,441

UNITED STATES PATENT OFFICE.

LEON W. CHASE, OF LINCOLN, NEBRASKA, ASSIGNOR TO CHASE PLOW COMPANY, OF LINCOLN, NEBRASKA, A CORPORATION OF NEBRASKA.

RIDGE-SPLITTER ATTACHMENT.

Application filed November 18, 1925. Serial No. 69,921.

My invention relates to ridge splitter attachments for lister plows to facilitate the use of the lister plows for "busting" or splitting the ridges made by the lister plows at a previous time.

The conservation of soil moisture is recognized as desirable in agricultural practice and in many localities such conservation is essential for the production of crops. One of the methods commonly practiced is the plowing of the fields with lister plows after the crop has been removed and subsequently using the same implement in the spring for levelling the field by "busting" or splitting the ridges formed in the preceding season. The blank lister ridges are allowed to remain through the winter to hold the rain and snow and ice in the furrows. The alternate freezing and thawing of the soil in the ridges mellows the top soil and leaves it in prime condition in the spring, with a great storage reservoir of moisture underneath. A similar advantage is gained by working the wheat and oats stubble ground with the lister plow in July or August and later "busting" the lister ridges shortly before the fall sowing of wheat or alfalfa. The difficulty has been in the keeping of the lister plows in the ridge lines. My invention has for its primary object the provision of a device for automatically keeping the lister plows in the ridges during travel. A second object of the invention is the provision of such a device which may be readily and easily attached to or detached from any two row lister plow. A further object is the provision of means for preventing lateral play in the device itself. Other objects include the provision of means whereby the guiding elements are automatically thrown out of operation when the plows are lifted and automatically thrown into operation when the plows are lowered, and also means for adjusting the guiding means to the depth of the furrow. Other objects will be brought out in the following description.

Referring now to the drawings,

Figure 1 is a side elevation of a lister plow with the attachment secured thereto.

Figure 2 is a plan view of the parts shown in Figure 1, both Figures 1 and 2 showing the plows and plow frame in outline and the attachment in full lines.

Figure 3 is a view in perspective of a portion of the attachment.

The lister plow shown in Figures 1 and 2 represents any lister plow on the market although the two views show a specific form of such an implement. The plows 10 are maintained in spaced apart relation on the plow frame. The seat bar 11 is positioned centrally on the plow frame and it has pivoted thereto a combined hand and foot lever 12 with connections 13 for raising and lowering the plows, the lever 12 having a projecting arm to which the connections 13 are secured. At its forward end the plow frame has a transverse beam 15 which is sometimes round and sometimes rectangular in cross section. The parts thus far described are no part of the present invention but they are here described in order to make clear the relation of the atttachment to the implement as a whole.

The attachment comprises a pair of spaced furrow guide wheels, a supporting frame for the furrow guide wheels, and devices for easily securing the attachment frame to the implement frame.

The furrow guide wheels 16 are secured to a shaft or axle 17 which is in turn secured to the U-shaped support 18, this support being preferably made by securing the two arms to a casting as shown in Figure 3, the casting having a sleeve portion for receiving the axle or shaft 17. At their outer ends the arms of the support 18 are turned outwardly and laterally, the ends being received in the clamps 19 so as to have rocking movement therein. The clamps 19 are necessarily varied according to the size and form of the front transverse beam 15 of the lister, but in general they each consist of two halves encircling the beam and held together by means of a bolt or other suitable securing device, and each clamp having a pivot socket for an end of the support 18.

At the lower end of the U-shaped support 18, in the casting shown in Figure 3, is an aperture for receiving the rod 20, which is secured at its upper end to the arm 14 of the lever 12, the securing means being the same as those which secure the connections 13 to the arm 14. The connections 13 and the rod 20 are on opposite sides of the arm 14, and since the connections 13 and the lower portion of the rod 20 both lie in the same vertical plane, the rod 20 is bent as shown in Figure 2. The lower portion of the rod 20 is provided with a number of apertures 21 for receiving cotter or other pins 22 which prevent displacement of the collars 23. The coil spring 24 surrounds the rod 20 and its ends bear against one of the collars 23 and the casting of the U-shaped support respectively.

The raising and the lowering of the plows simultaneously raises and lowers the furrow guide wheels 16. The slidable connection between the rod 20 and the casting of the U-shaped support permits the furrow guide wheels to yield and to ride over obstructions which might otherwise cause breakage or other damage. The spring 24 then restores the furrow guide wheels to their normal operative position and it tends to maintain an even pressure on the furrow guide wheels at all times. The degree of pressure of the spring may be varied by shifting the collar 23 and its retaining pin 22. The rod 20 may be shortened by shifting both collars 23 with their retaining pins. As before stated, the primary purpose of the invention is the provision of an attachment which may be applied to any two row lister plow found on the farms, and the adjustability in length of the rod 20 and in tension of the spring 24 makes it an easy matter to fit the attachment to any particular lister.

In use, the furrow guide wheels hug the sides of the lister furrow and thus prevent the lister plows from creeping down the furrow walls. The guiding is entirely automatic and requires no attention from the driver. There is considerable lateral pressure from time to time on the furrow guide wheels, but all lateral play in the guide wheels is prevented by the widely spaced pivots between the support 18 and the transverse beam 15 of the lister plow.

Having thus described my invention in a manner such that its structure and mode of operation will be clear to others skilled in the art to which it pertains, what I believe to be new and desire to secure by Letters Patent of the United States is:—

1. An attachment for two row lister plows, said attachment including a rearwardly and downwardly inclined support, said support being adapted to be detachably secured at its upper extremity to the front transverse beam of the lister plow frame and in pivotal relation therewith, furrow guiding means secured to said support at its lower extremity, a brace slidably secured in said support and extending rearwardly and upwardly therefrom, a coil spring surrounding said brace and bearing against said support for yieldably holding said furrow guiding means in operative position, and means on said brace for securing said brace to the plow raising and lowering lever of the implement.

2. An attachment for two row lister plows, said attachment including a pair of furrow guide wheels positioned between the lister plows and a support for said guide wheels, said support projecting upwardly and forwardly from said guide wheels and having means at its forward extremity for detachably securing it to the front portion of the implement frame at two spaced points, means adapted to connect the rear extremity of said support with the plow raising and lowering means of the implement whereby said guide wheels are raised and lowered when the plows are raised and lowered, and means permitting the yielding of said furrow wheels over obstructions.

3. An attachment for two row lister plows, said attachment including a casting and a pair of furrow guide wheels rotatably secured thereto, a pair of upwardly and forwardly extending arms secured to said casting, said arms being spaced in the transverse plane of the implement and having their forward end portions extending outwardly, a pair of detachable clamps on the front transverse beam of the implement frame, said clamps being provided with apertures for pivotally receiving said outwardly extending end portions of the said arms, a brace slidably and adjustably secured in said casting, said brace being upwardly and rearwardly inclined and being provided with an aperture at its upper extremity for receiving the connecting pin which secures the plow lifting connections to the lifting lever of the implement, and a coil spring surrounding said rod for yieldably holding said guide wheels in operative position.

In testimony whereof I affix my signature.

LEON W. CHASE.